United States Patent [19]
Lee

[11] Patent Number: 5,642,853
[45] Date of Patent: Jul. 1, 1997

[54] METHOD FOR BONDING STEEL TO COPPER

[75] Inventor: David Seung-Kyu Lee, Brookfield, Wis.

[73] Assignee: General Electric Company, Milwaukee, Wis.

[21] Appl. No.: 521,001

[22] Filed: Aug. 30, 1995

[51] Int. Cl.[6] .................................................. B23K 20/227
[52] U.S. Cl. ........................................ 228/127; 228/194
[58] Field of Search .................................. 228/127, 194, 228/132, 133

[56] References Cited

U.S. PATENT DOCUMENTS 2,267,665  12/1941  Raydt et al. ............................ 228/127
4,194,672   3/1980  Uto et al. ............................... 228/194

*Primary Examiner*—Kenneth J. Ramsey
*Attorney, Agent, or Firm*—B. Joan Haushalter; John H. Pilarski

[57] ABSTRACT

A method is used to bond dissimilar metals, such as for an x-ray tube. Copper and steel tubular components are provided. An interlayer material situated between the metal layers is used to bond the copper and steel tubular components by solid state diffusion process. The interlayer material may be pure nickel, pure copper, or a layered combination of nickel and copper or copper alloy. The use of the low cost interlayer material and the solid state diffusion process yields a strong bond between the dissimilar metals.

15 Claims, 2 Drawing Sheets

METHOD FOR BONDING STEEL TO COPPER

TECHNICAL FIELD

The present invention relates to bonding processes and, more particularly, to a solid-state diffusion bonding process of steel-to-copper tubings in coaxial form.

BACKGROUND ART

The x-ray tube has become essential in medical diagnostic imaging, medical therapy, and various medical testing and material analysis industries. Typical x-ray tubes are built with a rotating anode structure for the purpose of distributing the heat generated at the focal spot. The anode is rotated by an induction motor consisting of a cylindrical rotor built into an axle that supports the disc shaped anode target, and an iron stator structure with copper windings that surrounds the elongated neck of the x-ray tube that contains the rotor. The rotor of the rotating anode assembly being driven by the stator which surrounds the rotor of the anode assembly is at anodic potential while the stator is referenced electrically to ground. The x-ray tube cathode provides a focused electron beam which is accelerated across the anode-to-cathode vacuum gap and produces x-rays upon impact with the anode.

In an x-ray tube device, the induction-coupled rotor in vacuum comprises a copper outer tubing bonded to a carbon steel inner tubing. Current production methods of joining the dissimilar metals wall-to-wall for the x-ray tube application involves low melting alloy brazing or casting of molten copper onto steel material. Current practice uses a 100–150 microinch thickness of gold plating on steel tubing, which is then inserted into copper outer tubing with a minimum clearance. The assembly is also inserted into cylindrical molybdenum mold (thick wall) and set on one tubing end in a flat pan. The pan is then put on a conveyor belt that runs through a furnace at a nominal temperature of 1065° C. Since copper melts at 1083° C. and gold at 1063° C., a margin of the operating temperature is small. During heating in hydrogen atmosphere, for reducing surface oxidation and enhancing cleanliness, a low melting alloy starts forming at 955° C. from the interdiffusion between copper and gold. As the liquid is forming, the pressure built between the steel and copper tubing squeezes some of the gold-copper liquid metal to the ends of the tubing. Some of the gold atoms diffuse into solid copper and steel, forming a concentration gradient in each metal. During cooling, a thin layer of remaining liquid, mainly gold-copper alloy, in contact with steel and copper tubing surfaces freezes, forming a metallurgical bonding between the copper and steel tubings Therefore, the current practice is a brazing operation which involves a liquid phase.

Brazing with gold plating interlayer has created a very expensive step in the fabrication of x-ray tubes. This is primarily due to the high costs of gold material and plating chemicals and their handling charges. Furthermore, in spite of the increased cost, the brazing with gold plating interlayer does not provide a high temperature resistant joint for x-ray tube applications that require high thermal performance of the rotor.

It would be desirable then to have a new method of bonding the dissimilar metals of an x-ray tube which employs a low cost interlayer material to yield a strong bond at elevated temperatures.

SUMMARY OF THE INVENTION

The present invention provides for a method of bonding copper and steel tubular components for high temperature applications such as x-ray tube rotor bodies. The use of a low cost interlayer material and a solid state diffusion process yield a strong bond between the dissimilar metals, usable for x-ray tube applications.

In accordance with one aspect of the present invention, a method for bonding dissimilar metals in an x-ray tube comprises the steps of providing a copper tubular component and a steel tubular component. An interlayer material is also provided. A solid state diffusion bonding is then applied, using the interlayer material to bond the copper and steel tubular components.

Accordingly, it is an object of the present invention to provide a novel method of bonding steel to copper or copper alloy. It is a further object of the present invention to use a low cost interlayer material to achieve the bonding between the dissimilar metals. It is an advantage of the present invention that the bonding method yields a strong bonding of copper and steel tubular components for high temperature applications, such as x-ray tube rotor bodies.

Other objects and advantages of the invention will be apparent from the following description, the accompanying drawings and the appended claims.

DETAILED DESCRIPTION OF THE PREFERRED EMBODIMENTS

The present invention relates to x-ray tubes which employ a rotating anode assembly and a cathode assembly. The purpose of this invention is to improve the method of joining steel to copper or copper alloy tubing in constructing the rotor body of x-ray tubes.

Figure 1:
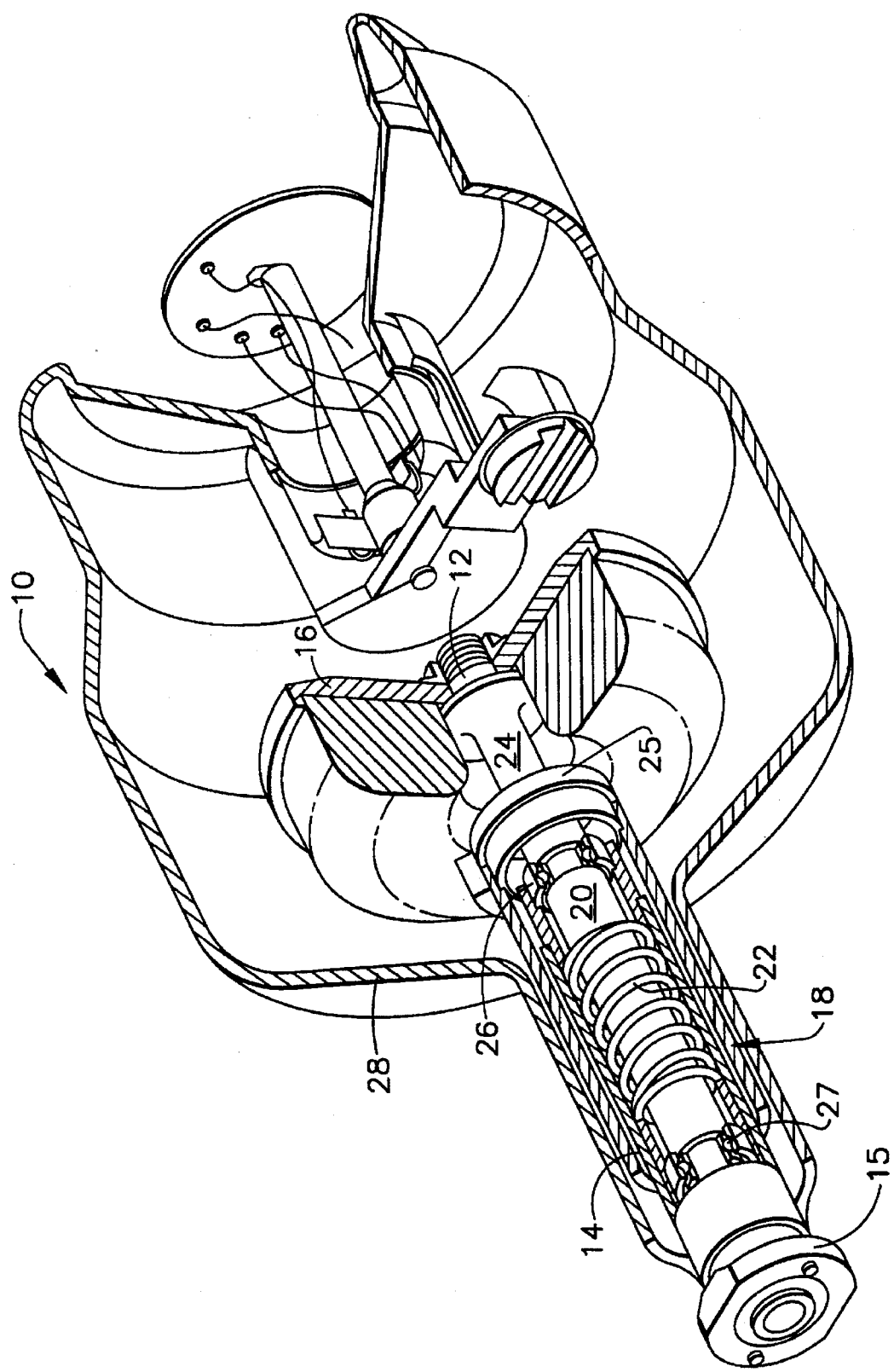
FIG. 1 is a simplified perspective view of a portion of an x-ray tube having a rotor body constructed in accordance with the present invention, with some parts shown in cross-section.

Referring now to the drawings, FIG. 1 illustrates an x-ray tube 10, similar to the x-ray tube disclosed in commonly assigned U.S. Pat. No. 4,935,948, incorporated herein by reference. The x-ray tube 10 comprises a rotor body 18 constructed in accordance with the present invention. The rotor is typically constructed of steel, such as commercially available, grade 1018 carbon steel, and copper or copper alloy tubing, such as GlidCop Al-15, commercially available from SCM Metals. The x-ray tube 10 is built with a rotating rotor of anode assembly 12, comprised of rotor 18, a rotor base 15, a stud 24 and a hub 25. The anode assembly 12 is rotated by an induction motor comprising the cylindrical rotor 18 built around an axle 20, with an associated spring 22. Rotor 18 and axle 20 rotate together since they are joined. A stem 14, connected to the rotor base, is stationary and provides an electrical path to the anode. The axle 20 supports a disc shaped anode target 16 connected via the stud 24 and hub 25 to rotor 18 and axle 20, which contains bearings 26, 27 facilitating rotation. The rotor 18 of the assembly 12, driven by a stator of the induction motor, is at anodic potential while the stator is referenced electrically to ground.

Continuing with FIG. 1, the x-ray tube 10 further comprises an x-ray tube cathode assembly for providing a focused electron beam which is accelerated across a large anode-to-cathode vacuum gap and producing x-rays upon impact with the anode. In a typical assembly, the anode assembly and the cathode assembly are sealed in a glass envelope 28.

Figure 2:
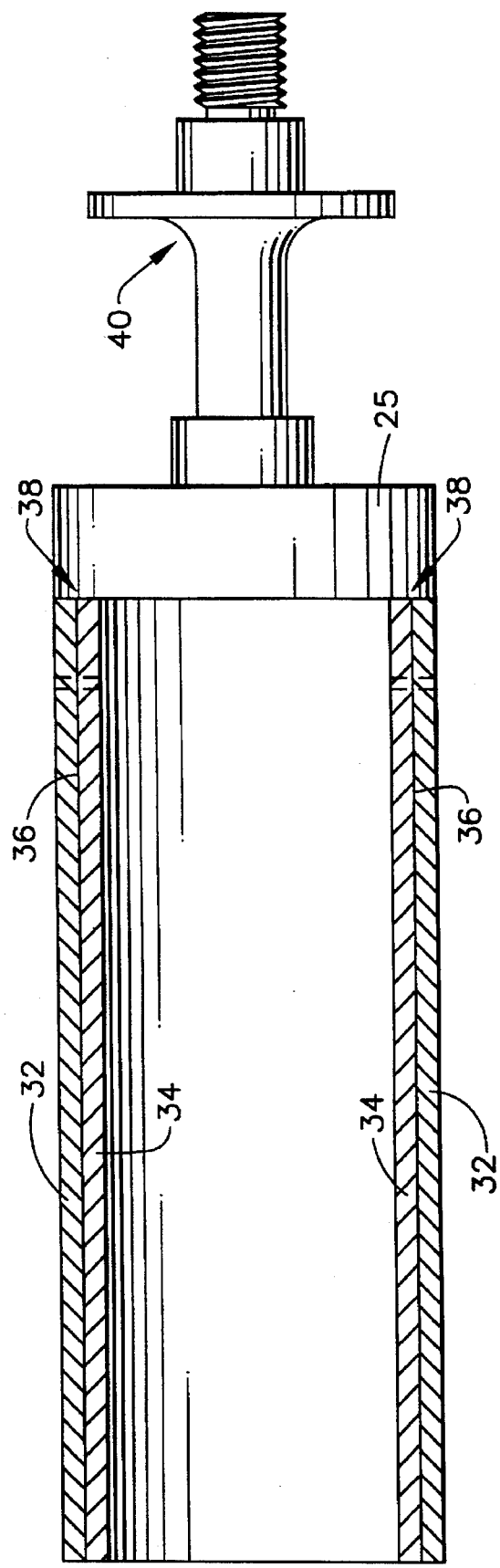
FIG. 2 is a cross-sectional illustration of the bonding of steel and copper layers of the x-ray tube of FIG. 1, in accordance with the present invention.

Referring now to FIG. 2, the present invention provides for a significant improvement in the bonding of the steel and copper metals. The method of bonding according to the present invention employs a low cost interlayer material such as copper or nickel in place of the gold plating in the prior art. The bonding layers illustrated in FIG. 2 include a copper layer 32 and a steel layer 34, joined via an interlayer material 36. The copper and steel layers 32 and 34 are bonded by solid-state diffusion bonding using an interlayer plated on steel or copper or both. The current art is to plate the interlayer on steel tubing. The interlayer material is preferably comprised of pure nickel plating, pure copper plating, or a layered combination of nickel and copper or copper alloy.

When casting molten copper on steel inner tubing, there is hardly a metallurgical bonding between the two, unless the steel is heated to a high enough temperature to form an alloy with copper. The joining in accordance with the present invention is primarily mechanical bonding, where liquid copper shrinks around steel when it solidifies, exerting a compressive force on the steel.

Continuing with FIG. 2, an end 38 is machined to fit a thermal barrier-hub and stud structure 40. The end 38 of the tubing is joined to the thermal barrier hub 25 which is joined to the stud for connecting to an x-ray anode (target). The present invention utilizes a close dimensional fit between the inner steel tubing outer diameter and outer copper tubing inner diameter with good surface finish and molybdenum mold. Typically, the steel outer diameter dimension is in the range of 1.3140–1.3145; and the copper inner diameter dimension is in the range of 1.3150–1.3155. Hence, a typical dimensional gap between the copper and steel is in the range of 0.5 to 1.5 mils, with a close dimensional tolerance being preferred. The dimensional gap between the copper and the molybdenum mold is typically in the range of 2 to 5 mils, again with a close dimensional tolerance being preferred. Surface roughness of both copper and steel is preferably controlled to below 32 microinches by honing and centerless grinding, respectively. The outer diameter surface of the steel tubing 34 is plated in pure nickel or copper to an average coating thickness of 120–150 microinches. The copper tubing is then chemically cleaned in an acidic solution, after water jet cleaning, and subsequently rinsed in de-ionized water and denatured alcohol prior to assembly, i.e., fitting the plated steel tubing into the copper tubing.

A fitted pair of steel and copper tubings (or GlidCop Al-15) is put into a high strength, low expansion cylindrical molybdenum mold, allowing a sliding fit with the copper-steel assembly. The assembly of steel, copper and molybdenum parts is heated in a hydrogen furnace in the neighborhood of 1065° C. in hot zone temperature for about 2–3 hours.

Bonding at temperatures below 1083° C., nickel or copper or their alloying with iron of the steel part does not form a liquid phase, hence, in a preferred embodiment of the present invention, solid-state diffusion bonding is applied, which allows all the plating thickness to develop an optimal joint strength. Particular importance of the present invention lies in the development of a strong interface having a melting point equal to or higher than that of the joining body, Cu, that is different from the Au-plated brazed joint.

The use of a Cu or Ni interlayer metal, in accordance with the present invention, provides excellent bonding of the joining bodies. Shear strength testing shows that the best results are obtained from oxygen free high conductivity (OFHC) copper to Ni-plated steel bonding and the GlidCop Al-15 to Cu-plated steel bonding. The resultant room temperature shear strengths of the bond interface are, at least, equal to that of gold brazing, and to the maximum shear strength of the OFHC copper joining body (i.e., 24 ksi), that is, a shear took place in the copper tubing, but not in the bonded joint. From metallurgical standpoints, the interlayer containing Ni or Cu is expected to be higher in high temperature strength than the Au—Cu phase, attributing to the differences in alloy melting points and strengths between them.

The process of the present invention does not result in bond delamination at the joint, even after five consecutive thermal cyclings up to 950° C., which is often used for evaluating the bonding of emissive oxide coating applied on the rotor. In a life test, an x-ray tube built with a Cu-plated steel rotor body, according to the present invention, ran over 400,000 second scans without bond delamination, under a tube test protocol that exceeds clinical operation conditions.

The present invention discloses interlayer materials and solid-state diffusion bonding process conditions that yield a strong bonding of dissimilar metals, such as copper and steel, particularly useful for high temperature applications, such as x-ray tube rotor bodies. However, it will be obvious to those skilled in the art that various modifications and variations of the present invention are possible without departing from the scope of the invention.

The invention has been described in detail with particular reference to certain preferred embodiments thereof, but it will be understood that modifications and variations can be effected within the spirit and scope of the invention.

I claim:

1. A method for bonding dissimilar metals of an x-ray tube comprises the steps of:
   providing a copper tubular component;
   providing a steel tubular component;
   applying a bonding process; and
   using an interlayer material, the interlayer material at least partially comprised of nickel, to bond the copper and steel tubular components during the bonding process.

2. A method for bonding dissimilar metals as claimed in claim 1 wherein the interlayer material comprises nickel and copper.

3. A method for bonding dissimilar metals as claimed in claim 1 wherein the step of applying a bonding process comprises the step of applying a solid-state diffusion bonding process.

4. A method for bonding dissimilar metals as claimed in claim 1 wherein the step of applying a bonding process comprises the step of utilizing differential thermal expansion.

5. A method for bonding dissimilar metals as claimed in claim 4 further comprising the step of providing a molybdenum mold.

6. A method for bonding dissimilar metals as claimed in claim 5 wherein the step of utilizing differential thermal expansion further comprises the step of using the molybdenum mold to restrain the copper tubular component during heating.

7. A method for bonding dissimilar metals as claimed in claim 6 wherein steel expansion exerts a pressure to the copper tubular component to achieve active contact necessary for solid-state diffusion.

8. A method for bonding dissimilar metals as claimed in claim 1 further comprising the step of applying surface preparation.

9. A method for bonding dissimilar metals as claimed in claim 1 wherein the copper tubular component comprises pure copper.

10. A method for bonding dissimilar metals as claimed in claim 1 wherein the copper tubular component comprises copper alloy.

11. A method for bonding dissimilar metals as claimed in claim 1 wherein the steel tubular component comprises 1018 steel.

12. A method for bonding dissimilar metals of an x-ray tube comprises the steps of:
   providing a copper tubular component;
   providing a steel tubular component;
   applying a solid-state diffusion bonding process; and
   using an interlayer material to bond the copper and steel tubular components during the bonding process.

13. A method for bonding dissimilar metals as claimed in claim 12 wherein the interlayer material comprises a nickel interlayer material.

14. A method for bonding dissimilar metals as claimed in claim 12 wherein the interlayer material comprises a copper interlayer material.

15. A method for bonding dissimilar metals as claimed in claim 12 wherein the interlayer material comprises nickel and copper.

* * * * *